UNITED STATES PATENT OFFICE.

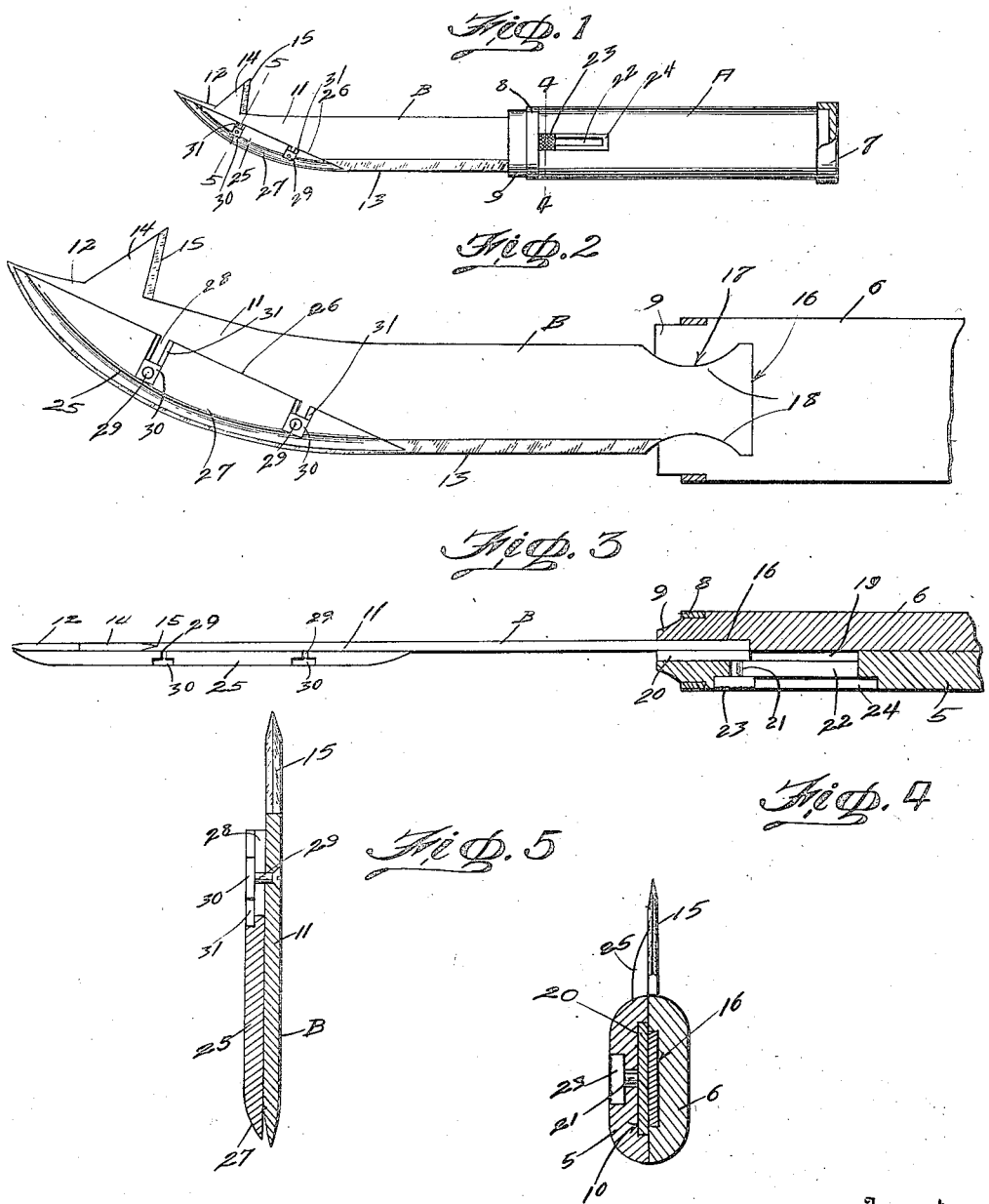

HERMAN ANDREW GUSTAVE TREPTO, OF RALEIGH, NORTH DAKOTA.

KNIFE.

1,282,322.

Specification of Letters Patent.

Patented Oct. 22, 1918.

Application filed December 27, 1917. Serial No. 209,086.

*To all whom it may concern:*

Be it known that I, HERMAN A. G. TREPTO, a citizen of the United States, residing at Raleigh, in the county of Grant, State of North Dakota, have invented certain new and useful Improvements in Knives; and I do hereby declare the following to be a full, clear, and exact description of the invention, such as will enable others skilled in the art to which it appertains to make and use the same.

The invention relates to a knife and more particularly to the class of safety skinning and sticking knives for use by butchers.

The prime object of the invention is the provision of a knife of this character, wherein a skinning or sticking knife blade can be conveniently fastened within the handle of said knife for use, either in skinning an animal, sticking the same or ripping the hide thereof.

Another object of the invention is the provision of a knife of this character, wherein the blade carries a guard to protect the hide of the animal when in the act of skinning the same to avoid the cutting of the hide, the guard being mounted for adjustment on the blade in a novel manner to regulate the cutting action of said blade.

A further object of the invention is the provision of a knife of this character wherein the blade is adjustably fastened in the handle in a novel manner to avoid the play of said blade and the accidental working loose thereof when held within the handle thus eliminating the possibility of cutting the user of the knife.

A still further object of the invention is the provision of a knife of this character which is extremely simple in construction, handy for use, thoroughly reliable and efficient in its purpose, strong, durable and inexpensive to manufacture.

With these and other objects in view the invention consists in the features of construction, combination and arrangement of parts, as will be hereinafter fully described, illustrated in the accompanying drawing and pointed out in the claim hereunto appended.

In the accompanying drawing:

Figure 1 is a side elevation of a knife constructed in accordance with the invention;

Fig. 2 is a fragmentary longitudinal sectional view through the handle showing the knife blade engaged therein;

Fig. 3 is a fragmentary transverse sectional view taken longitudinally of the knife;

Fig. 4 is a sectional view on the line 4—4 of Fig. 1;

Fig. 5 is a sectional view on the line 5—5 of Fig. 1.

Similar reference characters indicate corresponding parts throughout the several views in the drawing.

Referring to the drawing in detail, A designates generally a handle preferably made from metal although it may be made from other material and is formed in two sections 5 and 6 respectively which are shaped correspondingly to each other and are held together by the end cap 7 and a band or collar 8, the cap being fastened upon the heel end of the handle A, while the band or collar embraces the other end of said handle. The handle A at the end opposite the cap 7 is preferably reduced to form a narrow throat extension 9 which is provided with a slot 10 for detachably receiving the blade B hereinafter fully described.

The blade B is preferably straight for a major portion of its length having a curved end portion 11 terminating in a pointed tip 12 the straight and curved portions of the blade being provided with a beveled cutting edge 13, and at the blunt heel edge of the curved portion 11 adjacent to the tip 12 is a pointed projection 14 having the beveled cutting edge 15 and this projection with its cutting edge is used for ripping the hides of animals.

In one side wall of the slot 10 is formed a recess 16 which is provided with opposed inwardly directed arcuate shaped edges 17 and in this recess 16 is adapted to be received the inner end of the blade B, which end portion is formed with opposed notches 18 correspondingly shaped to the edges 17 of the recess 16 for receiving the same and in this manner the blade B is retained against longitudinal displacement in this recess 16 when engaged therein.

In a suitable cavity or guideway 19 formed interiorly of the handle A is a locking or retaining slide 20 which is adapted to be moved into and out of the slot 10 through the throat extension 9 to overlie the inner end of the blade when engaged in the recess 16 and thereby lock the said blade B detachably secured in the handle. The slide 20 has fixed therein a lug 21 which projects outwardly through an elongated slot 22 opening through the outer face of the handle A and communicating with the cavity or guideway 19, the lug being fitted with or having formed integral therewith a finger knob 23 which is slidably engaged in a groove or channel 24 in the outer face of the handle so that the finger knob 23 will be countersunk in the handle thereby avoiding the undue projecting of the knob therefrom. The slide 20 is moved by actuating the finger knob 23 to lock the blade B in the handle A or to permit the detachment of the blade therefrom.

On the blade B throughout the curved end portion 11 thereof is a guard which comprises a plate 25 having the straight edge 26 and the rounded curvilinear edge 27 which matches the cutting edge of the curved end portion 11. This plate 25 is detachably and adjustably mounted on one side of the blade B and is formed with spaced slots 28 at right angles to the straight edge 26 and opening therethrough. Passed through the blade B into the slots 28 in the plate 25 are bolt members 29 the heads of which are countersunk within the blade B to be flush with the side face thereof and upon these bolts are nuts 30 which fit within countersinks 31 formed in the outer face of the plate 25 so that the outer side of the nuts will be flush with the outer face of said plate. On adjustment of the nuts 30 on bolt members 29 the plate 25 constituting the guard can be adjusted relative to the cutting edge of the curved end portion 11 of the blade thereby regulating the depth of cutting action of the blade when skinning the animal. The plate 25 which constitutes the guard prevents the cutting of the hide when skinning the animal.

It is to be understood that the shape of the blade can be varied as the occasion may require, the tip 12 of the said blade which is pointed is designed for sticking the animal in the usual manner. The knife by its construction is adaptable particularly for use by butchers and renders the skinning of the animal, the ripping of the hide or the sticking of said animal comparatively simple.

From the foregoing it is thought that the construction and manner of use of the knife will be clearly understood, and therefore a more extended explanation has been omitted.

What is claimed is:

In a knife, a handle having a slot in one end and opening through the same, one side wall of the slot being formed with a seat having opposite convexed edges, a cutting blade removably insertible in the slot and having notches in opposed edges near one end corresponding to the convexed edges of the seat for the interfitting of said edges in the notches on the engagement of the end of the blade in the seat, a slide plate fitted in the slot and movable over the notched end of the blade when in the seat to lock the same therein, and a finger engaging lug on the slide plate and exposed at one side of the handle exteriorly thereof for operating said slide plate.

In testimony whereof, I affix my signature in the presence of two witnesses.

HERMAN ANDREW GUSTAVE TREPTO.

Witnesses:
H. WOLFGRAM,
M. P. EKEE.